United States Patent
Hetzler

(10) Patent No.: US 10,527,403 B2
(45) Date of Patent: Jan. 7, 2020

(54) MEASURING DEVICE FOR INTERFEROMETRIC DETERMINATION OF A SHAPE OF AN OPTICAL SURFACE

(71) Applicant: Carl Zeiss SMT GmbH, Oberkochen (DE)

(72) Inventor: Jochen Hetzler, Aalen (DE)

(73) Assignee: CARL ZEISS SMT GMBH, Oberkochen (DE)

(*) Notice: Subject to any disclaimer, the term of this patent is extended or adjusted under 35 U.S.C. 154(b) by 0 days.

(21) Appl. No.: 16/251,703

(22) Filed: Jan. 18, 2019

(65) Prior Publication Data
US 2019/0154427 A1   May 23, 2019

Related U.S. Application Data

(63) Continuation of application No. PCT/EP2017/000875, filed on Jul. 19, 2017.

(30) Foreign Application Priority Data

Jul. 20, 2016   (DE) .................. 10 2016 213 237

(51) Int. Cl.
| | |
|---|---|
| G01B 9/02 | (2006.01) |
| G01B 11/24 | (2006.01) |
| G01M 11/02 | (2006.01) |

(52) U.S. Cl.
CPC ...... *G01B 9/02039* (2013.01); *G01B 11/2441* (2013.01); *G01M 11/025* (2013.01); *G01M 11/0264* (2013.01); *G01M 11/0271* (2013.01); *G01B 2290/50* (2013.01)

(58) Field of Classification Search
CPC ............ G01B 9/02039; G01B 11/2441; G01B 2290/50; G01B 9/02057; G01M 11/025; G01M 11/0264; G01M 11/0271
See application file for complete search history.

(56) References Cited

U.S. PATENT DOCUMENTS

| | | | |
|---|---|---|---|
| 6,643,024 B2 | 11/2003 | Deck et al. | |
| 2001/0028462 A1 | 11/2001 | Ichihara et al. | |
| 2019/0219931 A1* | 7/2019 | Zwier | G03F 7/70158 |

FOREIGN PATENT DOCUMENTS

| | | |
|---|---|---|
| DE | 102007021953 A1 | 11/2008 |
| WO | 2006077145 A2 | 7/2006 |
| WO | 2009006914 A1 | 1/2009 |

OTHER PUBLICATIONS

International Search Report, PCT/EP2017/000875, dated Oct. 20, 2017, 4 pages.

* cited by examiner

*Primary Examiner* — Hwa Andrew Lee
(74) *Attorney, Agent, or Firm* — Edell, Shapiro & Finnan, LLC

(57) ABSTRACT

A measurement apparatus (10) for determining a shape of an optical surface. An illumination module (16) produces an illumination wave (34), an interferometer (18) splits the wave into a test wave (50), which is directed onto the optical surface, and a reference wave (52). The relative tilt between the waves produces a multi-fringe interference pattern (66) in a detection plane (62) of the interferometer when the waves are superposed. A pupil plane (28) of the illumination module is arranged in a Fourier plane of the detection plane and the illumination module is configured to produce the illumination wave so that the intensity distribution thereof in the pupil plane includes at least one spatially isolated and contiguous surface region (38) such that a rectangle (74) with the smallest possible area fitted to the surface region or the totality of surface regions has an aspect ratio of at least 1.5:1.

19 Claims, 7 Drawing Sheets

US 10,527,403 B2

MEASURING DEVICE FOR INTERFEROMETRIC DETERMINATION OF A SHAPE OF AN OPTICAL SURFACE

CROSS REFERENCE TO RELATED APPLICATIONS

This is a Continuation of International Application PCT/EP2017/000875, which has an international filing date of Jul. 19, 2017, and the disclosure of which is incorporated in its entirety into the present Continuation by reference. In addition, the present Continuation claims the benefit of and priority to German patent application 10 2016 213 237.7, filed Jul. 20, 2016. The entire content and disclosure of this German patent application is also incorporated by reference into the present Continuation.

FIELD OF THE INVENTION

The invention relates to a measurement apparatus and a method for determining a shape of an optical surface of a test object by interferometry.

BACKGROUND

By way of example, such a measurement apparatus is described in WO 2006/077145 A2. This measurement apparatus comprises a Fizeau interferometer, with which a measurement wave with a wavefront that is adapted to the intended shape of the optical surface is produced. The wavefront of the adapted measurement wave is evaluated by interferometry after reflection of the optical surface for the purposes of determining the deviation of the actual shape of the optical surface from the intended shape thereof. The Fizeau interferometer according to WO 2006/077145 A2 is a so-called common path interferometer, in which the paths of the interfering partial beams extend along the same optical path or are at least tightly adjacent to one another in space. However, such common path interferometers are susceptible to phase disturbances that are caused by mechanical vibrations of the test object or by air schlieren in the interferometer cavity. This phase susceptibility can be prevented by the use of a multi-fringe interferometer. In such a multi-fringe or multiple fringe interferometer, the interfering partial beams extend with such a tilt in relation to one another that a multi-fringe interference pattern arises.

By way of example, the optical element with the optical surface is an optical component, such as, for instance, a lens element or a mirror. Such optical components are used in optical systems, for instance in a telescope used in astronomy or in an imaging system, as is used in lithographic methods. The success of such an optical system is substantially determined by accuracy with which the optical components thereof can be produced and processed to the effect of the surfaces thereof corresponding to an intended form in each case, said form being set by a designer of the optical system during the design thereof. Within the scope of such production, it is necessary to compare the form of the processed optical surfaces with the intended form thereof and determine differences or deviations between the manufactured surface and the intended surface. Then, the optical surface can be processed in those regions in which the differences between the processed face and the intended face exceed predetermined thresholds, for example.

Disturbances that can be traced back to defects on the optical surfaces of the interferometer often occur during the highly precise measurement of optical surfaces using multi-fringe interferometry. Here, the illumination in these interferometers can be chosen in such a way that the disturbances are minimized to the best possible extent. This can be implemented by virtue of using an extended circular light source in the illumination pupil instead of a "punctiform" light source with an extent of no more than one airy diameter. The extended light source leads to unsharp imaging of the defect and hence to a significant reduction in the measurement error. However, a disadvantage thereof is that the contrast of the multi-fringe interferogram is reduced, leading to a poorer signal-to-noise ratio.

SUMMARY

It is an object of the invention to provide an apparatus and a method, by which the aforementioned problems are addressed and by which, in particular, a determination of a surface form using multi-fringe interferometry is facilitated, the latter characterized by a high interferogram contrast and, at the same time, low susceptibility to errors in relation to defects in the optical faces of the interferometer.

The above-described object can be achieved according to the invention, for example, with a measurement apparatus, described below, for determining a shape of an optical surface of a test object by interferometry. The measurement apparatus according to one formulation of the invention comprises an illumination module for producing an illumination wave, an interferometer configured to split the illumination wave into a test wave, which is directed onto the optical surface, and a reference wave with such a tilt in relation to one another that a multi-fringe interference pattern is produced in a detection plane of the interferometer by the superposition of said waves. Here, the illumination module has a pupil plane that is arranged in a Fourier plane of the detection plane and the illumination module is configured to produce the illumination wave in such a way that the intensity distribution thereof in the pupil plane comprises one or more spatially isolated and contiguous surface regions that are configured in such a way that a rectangle with the smallest possible area that is fitted to the surface region or the totality of surface regions has an aspect ratio of at least 1.5:1, in particular at least 2:1 or at least 3:1.

Expressed differently, the illumination module according to a first variant is configured to produce the illumination wave in such a way that the intensity distribution thereof in the pupil plane comprises a spatially isolated, contiguous surface region, the shape of which is configured in such a way that a rectangle with the smallest possible area that is fitted thereto has an aspect ratio of at least 1.5:1. According to a second variant, the illumination module is configured to produce the illumination wave in such a way that the intensity distribution thereof in the pupil plane comprises a plurality of spatially isolated, contiguous surface regions, which are configured or arranged in such a way that a rectangle with the smallest possible area that is fitted to the totality of the surface regions has an aspect ratio of at least 1.5:1.

A rectangle with the smallest possible area that is fitted to the spatially isolated, contiguous surface region should be understood to mean a rectangle which, in terms of area, is fitted to the spatially isolated surface region to the best possible extent; i.e., it is that rectangle of the rectangles completely comprising the spatially isolated surface area that has the smallest possible area.

The reference wave is superposed on the test wave after the interaction of the test wave with the optical surface. By evaluating the multi-fringe interference pattern, it is possible to determine a deviation of the shape of the optical surface from an intended shape and hence the shape of the optical surface of the test object itself. The tilted split is implemented in such a way that the reference wave is tilted in relation to the test wave after interaction with the optical surface. Splitting the illumination wave into the test wave and reference wave can be implemented with a splitting element, for instance a Fizeau element. According to one exemplary embodiment, the test wave after interaction with the optical surface travels back along the beam path of the test wave prior to the interaction thereof with the optical surface. In this case, the tilt angle between the reference wave and the test wave after interaction with the optical surface is identical to the tilt angle between the reference wave and the reverse propagation direction of the test wave at the location of the split.

In this text, a multi-fringe interference pattern should be understood to mean an interference pattern that comprises at least one full period of alternating fringes of constructive and destructive interference. A full period should be understood to mean that the phase difference between the interfering waves adopts all values between 0 and $2\pi$ along the multi-fringe interference pattern. Expressed differently, a multi-fringe interference pattern should be understood to mean an interference pattern having at least two fringes, when the fringes can be bright fringes (constructive interference) or dark fringes (destructive interference). In particular, a multi-fringe interference pattern can comprise at least two, at least five, at least ten, at least fifty or at least one hundred full periods of alternating fringes of constructive and destructive interference.

The spatially isolated, contiguous surface area present in the pupil plane of the illumination module can be a bright region (i.e., a region of high intensity) in comparatively dark surroundings (comparatively low intensity). By way of example, the comparatively low intensity in the dark surroundings can be less than 50% of the comparatively high intensity of the bright region.

According to one embodiment, the intensity distribution of the pupil plane comprises at least the one contiguous surface region; i.e., the first variant is present, in which the intensity distribution in the pupil plane comprises a spatially isolated, contiguous surface region, the shape of which is configured in such a way that a rectangle with the smallest possible area that is fitted thereto has an aspect ratio of at least 1.5:1. According to this embodiment, the contiguous surface region is designed as a fringe.

According to a further embodiment, the intensity distribution of the pupil plane comprises the plurality of contiguous surface regions; i.e., the second variant is present, in which the intensity distribution in the pupil plane comprises a plurality of spatially isolated, contiguous surface regions, which are configured or arranged in such a way that a rectangle with the smallest possible area that is fitted to the totality of the surface regions has an aspect ratio of at least 1.5:1. According to this embodiment, a covering surface that is adapted in form to the totality of the surface regions is designed as a fringe. In this context, a covering surface that is adapted in form to the totality of the surface regions should be understood to mean an area that covers the spatially isolated, contiguous surface regions and, at the same time, is fitted to an extrapolated or abstracted shape of the arrangement of the surface areas. By way of example, such a covering surface that is adapted in form can also be implemented by mathematical determination of an enveloping curve around the surface regions while minimizing a combination of the circumference and area contained within the enveloping curve.

The provision of a fringe in the pupil intensity distribution facilitates the production of the multi-fringe interference pattern with a high contrast with, at the same time, a low susceptibility to errors in relation to defects present on the surfaces of the interferometer.

According to one embodiment, the tilt of the reference wave in relation to the test wave is greater than a minimum tilt angle, wherein the minimum tilt angle is defined by the hundred-fold, in particular the five-hundred-fold, of the quotient of the wavelength of the illumination wave and the beam diameter of the illumination wave at the location where the illumination wave is split into the test wave and the reference wave. The beam diameter of the illumination wave at the location of the split can correspond to the diameter of an adaptation optical unit that is arranged in the beam path of the illumination wave for adapting the wavefront of the illumination wave to an intended shape of the optical surface of the test object. This adaptation optical unit can be embodied as a collimator which is arranged upstream of the interaction of the illumination wave with the surface of the test object. The reference wave is superposed on the test wave after the interaction of the test wave with the optical surface. By evaluating the multi-fringe interference pattern, it is possible to determine a deviation of the shape of the optical surface from an intended shape and hence the shape of the optical surface of the test object itself.

According to one embodiment variant, the fringe is an arcuate fringe; according to a further embodiment variant, it is a straight fringe. An arcuate fringe should be understood to mean a fringe that has curvature present in one direction, i.e., the fringe is either curved to the left or curved to the right. Here, in addition to an exactly arcuate fringe, a fringe composed of a plurality of straight portions arranged along an arc should also be understood to be such an arcuate fringe. A straight fringe should be understood to mean a rectangular surface region with an aspect ratio of at least 1.5:1.

According to a further embodiment, the pupil of the illumination module assigned to the pupil plane is delimited by a ring-shaped edge and the fringe extends transversely to the edge of the pupil. Expressed differently, the arcuate fringe does not extend along the edge of the pupil in particular. While such an edge-side curve may be suitable for common path interferometers, it would not have the desired effect on the contrast of the multi-fringe interference pattern that is produced in the measurement apparatus according to the invention.

According to a further embodiment, the pupil of the illumination module assigned to the pupil plane is delimited by a ring-shaped edge and the at least one arcuate fringe is configured in such a way that there is at least a tangent on the arcuate fringe which subdivides the pupil into two parts, the areas of which differ by no more than a factor of twenty. Expressed differently, the areas that arise by dividing the pupil with the at least one tangent have a ratio of 1:20 or a more balanced ratio, i.e., they have a ratio that lies between 1:1 and 1:20. According to further embodiments, the areas of the two parts of the pupil differ by no more than a factor of ten or by no more than a factor of five. By way of example, an arcuate fringe extending along the ring-shaped edge of the pupil does not satisfy the aforementioned condition.

According to one embodiment variant, each tangent on at least one portion of the arcuate fringe comprising at least 20%, in particular at least 50% or at least 70%, of the arcuate fringe overall subdivides the pupil into two parts in each case, the areas of which differ by no more than a factor of twenty, in particular by no more than a factor of ten or by no more than a factor of five. By way of example, a fringe extending along the edge of the pupil does not satisfy this requirement.

In this text, a path length should always be understood to mean an optical path length. The optical path length within an optical element is the product of geometric path length and refractive index.

According to a further embodiment, a path length difference of a pupil point in the pupil plane for a field point in the detection plane is defined by the difference between a test object path length and a reference path length, in which the test object path length is the path length run through by the radiation of the test wave from the pupil point to the field point in the detection plane and the reference path length is the path length run through by the radiation of the reference wave from the pupil point to the field point in the detection plane. Here, the fringe, in particular the contiguous surface region of the intensity distribution of the illumination wave in the pupil plane, extends along a level curve of the path length difference of the field point. Level curves of the path length difference are lines that are composed of points with the same path length difference. In particular, the angle-resolved intensity distribution of the illumination wave in the pupil plane is configured in such a way that the arcuate fringe extends along the level curve of the path length difference for a plurality of field points, in particular for the plurality of field points in the region of the detection plane in which the multi-fringe interference pattern is produced.

According to one embodiment variant, a plurality of fringes of the aforementioned type extend in the pupil plane along level curves of the path length difference of the field point, wherein the level curves differ by integer multiples of the wavelength of the illumination wave.

According to a further embodiment, the intensity distribution in the pupil plane comprises a plurality of fringes of the aforementioned type, in particular a plurality of fringes such as, for instance, arcuate fringes in one of the above-described embodiments. According to one embodiment variant, the intensity distribution comprises three, four, five or more fringes, in particular contiguous surface regions. Each of the fringes can have the properties that are specified above in respect of different embodiments.

According to a further embodiment, the interferometer is configured to merge the test wave post interaction with the optical surface and the reference wave in a superposed beam path, in which the reference wave is tilted in relation to the test wave by a tilt angle $\beta$, for which the following holds true: $\beta > 100 \cdot \lambda/D$, where $\lambda$ is the wavelength of the illumination wave and D is the beam diameter of the reference wave at the location of merging into the superposed beam path with the test wave. According to one embodiment, D also corresponds to the beam diameter of the illumination wave at the location where the illumination wave is split into the test wave and the reference wave. In particular, the tilt angle can be greater than $200 \cdot \lambda/D$ or greater than $500 \cdot \lambda/D$. The beam diameter of the illumination wave at the location of the split can correspond to the diameter of an adaptation optical unit that is arranged in the beam path of the illumination wave for adapting the wavefront of the illumination wave to an intended shape of the optical surface of the test object. This adaptation optical unit can be embodied as a collimator which is arranged upstream of the interaction of the illumination wave with the surface of the test object.

According to a further embodiment, the interferometer comprises a splitting element for splitting the illumination wave into the test wave and the reference wave and said interferometer is further configured to merge the test wave post interaction with the optical surface and the reference wave into a superposed beam path in which the reference wave is tilted in relation to the test wave by a tilt angle $\beta$. Furthermore, the illumination module is configured in such a way that the intensity distribution in the pupil plane in at least one direction has an extent $L_{Bel}$, for which the following holds true:

$$L_{Bel} > \lambda \cdot \frac{f}{l \cdot \beta},$$

where $\lambda$ is the wavelength of the illumination wave, f is a distance between the pupil plane of the illumination module and an adaptation optical unit of the interferometer for adapting the wavefront of the illumination wave to an intended form of the optical surface of the test object, and l is a distance between the splitting element and the optical surface of the test object. According to an embodiment variant, the intensity distribution of the pupil plane in at least one direction has an extent $L_{Bel}$ of greater than 1 mm, in particular of greater than 2 mm or greater than 5 mm. The adaptation optical unit can be embodied as a collimator which is arranged upstream of the interaction of the illumination wave with the surface of the test object.

According to a further embodiment, the intensity distribution in the pupil plane is configured in such a way that the multi-fringe interference pattern has a contrast of at least 50% in at least one region. In particular, the multi-fringe interference pattern has a contrast of at least 60%, at least 70% or at least 80% in at least one region. The region of the multi-fringe interference pattern with the aforementioned contrast preferably lies in the center of the interference pattern. Preferably, the entire region of the multi-fringe interference pattern has the aforementioned contrast, wherein this region may comprise, e.g., at least 10%, at least 20% or at least 50% of the area of the entire multi-fringe interference pattern. In this text, the contrast K of a multi-fringe interference pattern is defined as follows:

$$K = \frac{I_K - I_D}{I_K + I_D},$$

where $I_K$ denotes intensity of fringes with constructive interference and $I_D$ denotes intensity of adjoining fringes with destructive interference.

According to a further embodiment, the intensity distribution is configured in such a way that no more than 70%, in particular no more than 50% or no more than 30%, and, in particular, at least 10% or at least 20% of the pupil, assigned to the pupil plane, of the illumination module is illuminated.

A percentage illumination of the pupil should be understood to mean that only the specified portion of the pupil is irradiated with appreciable intensity, wherein the appreciable intensity can be understood to mean an intensity that is less than 10%, in particular less than 5%, of the maximum intensity in the pupil.

According to a further embodiment, the illumination module comprises a spatial light modulator for producing the intensity distribution in the pupil plane. Such spatial light modulators, also referred to as SLMs, are known in terms of their principle from beamers, for example, and can be actuated electronically. In comparison with the use of a mechanical stop, for example, such spatial light modulators facilitate a high light yield, which may be almost 100%. The use of an actuatable spatial light modulator facilitates a variable adjustment of the intensity distribution in the pupil plane.

According to one embodiment, the illumination module further comprises a diffusion screen that is arranged in the pupil plane and that rotates during operation for the purposes of producing incoherence.

Furthermore, a method for determining a shape of an optical surface of a test object by interferometry is provided according to a further formulation of the invention, wherein an illumination wave is produced with an illumination module and the illumination wave is split with an interferometer into a test wave, which is directed onto the optical surface, and a reference wave, which are tilted in relation to one another in such a way that a multi-fringe interference pattern is produced in a detection plane of the interferometer by the superposition of said waves, wherein the illumination wave is produced in such a way that the intensity distribution thereof in a pupil plane arranged in the Fourier plane of the detection plane comprises one or more spatially isolated and contiguous surface regions that are configured in such a way that a rectangle with the smallest possible area that is fitted to the surface region or the totality of surface regions has an aspect ratio of at least 1.5:1.

The features specified with regard to the aforementioned embodiments, exemplary embodiments and embodiment variants, etc. of the measurement apparatus according to the invention can correspondingly be applied to the method according to the invention. These and other features of the embodiments according to the invention are explained in the description of the figures and in the claims. The individual features can be implemented, either separately or in combination, as embodiments of the invention. Furthermore, they can describe advantageous embodiments which are independently protectable and protection for which is claimed if appropriate only during or after pendency of the application.

BRIEF DESCRIPTION OF THE DRAWINGS

The above and further advantageous features of the invention are illustrated in the following detailed description of exemplary embodiments according to the invention with reference to the accompanying schematic drawings. In the figures:

FIG. 13A shows a large central illumination disk and a low contrast, FIG. 13B shows a medium central illumination disk and a medium contrast, and FIG. 13C shows a small central illumination disk and a high contrast.

DETAILED DESCRIPTION

In the exemplary embodiments embodiment variants described below, elements which are functionally or structurally similar to one another are provided with the same or similar reference signs as far as possible. Therefore, for understanding the features of the individual elements of a specific exemplary embodiment, reference should be made to the description of other exemplary embodiments or the general description of the invention.

Figure 1:
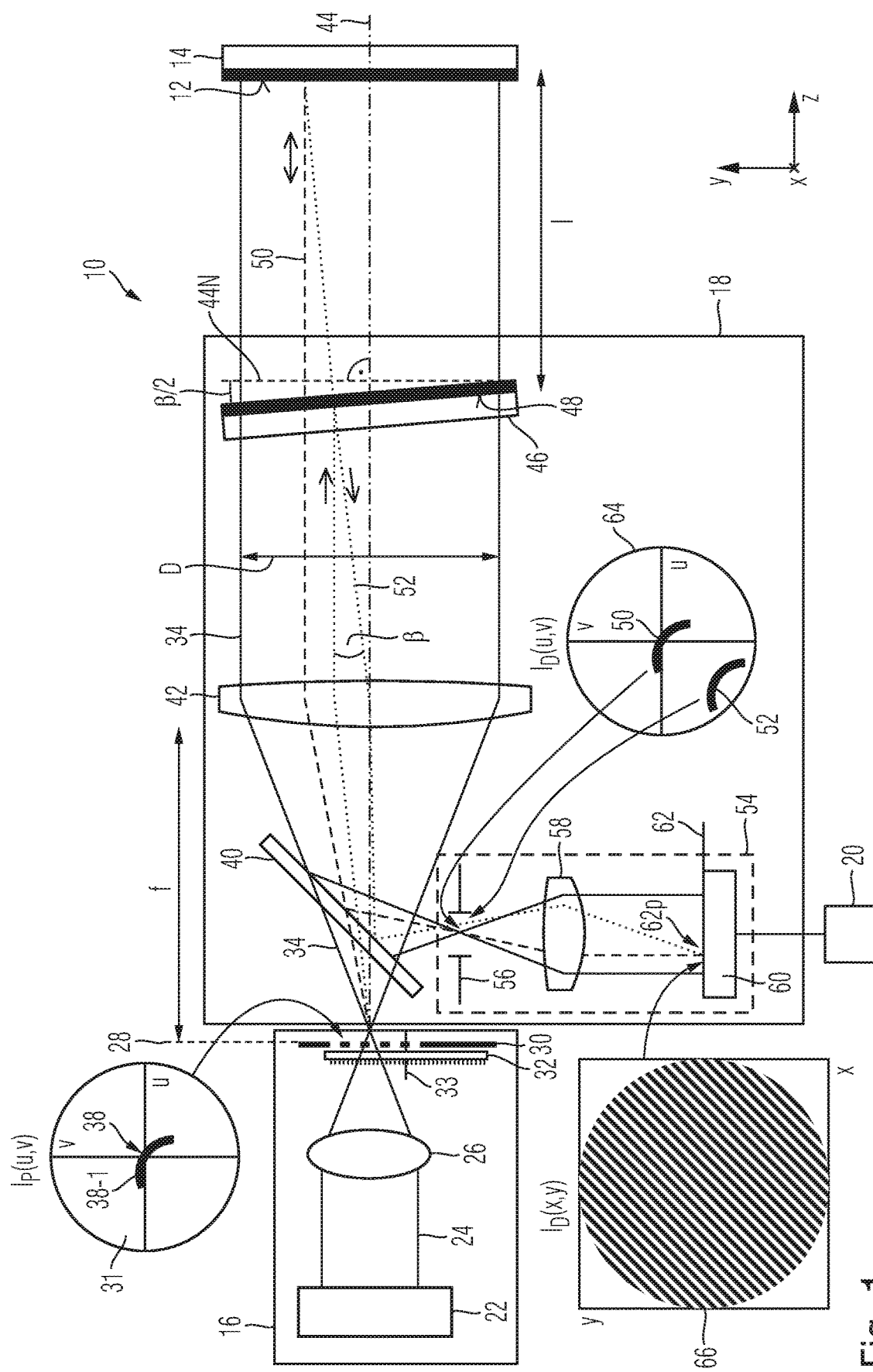
FIG. 1 shows an exemplary embodiment of a measurement apparatus according to the invention for determining a shape of an optical surface of a test object by interferometry.

In order to facilitate the description, a Cartesian xyz-coordinate system is indicated in the drawing, from which system the respective positional relationship of the components illustrated in the figures is evident. In FIG. 1, the x-direction runs perpendicular and into the plane of the drawing, the z-direction toward the right, and the y-direction upwardly.

FIG. 1 illustrates an interferometric measurement apparatus 10 in one embodiment according to the invention. The measurement apparatus 10 is suitable for determining a deviation of an actual shape from an intended shape of an optical surface 12 of a test object, from which the actual shape of the optical surface 12 arises. By way of example, the test object 14 can be present in the form of an optical lens or a mirror, in particular a projection lens of a microlithographic projection exposure apparatus. In the case of a mirror, this can relate to an optical element of an EUV projection exposure apparatus. The test object 14 is assembled using a holder that is not illustrated in the drawing.

The measurement apparatus 10 comprises an illumination module 16, an interferometer 18 and an evaluation device 20. The illumination module 16 comprises a radiation source 22 for producing measurement radiation 24, for example in the form of a laser such as, for instance, a helium-neon laser for producing a laser beam. The measurement radiation 24 has sufficiently coherent light for carrying out an interferometric measurement. In the case of a helium-neon laser, the wavelength of the measurement radiation 24 is approximately 633 nm. However, the wavelength of the measurement radiation also may have different wavelengths in the visible and non-visible wavelength range of electromagnetic radiation.

The measurement radiation 24 is focused onto a mechanical illumination stop 30 arranged in a pupil plane 28 of the illumination module 16 in such a way by way of a focusing optical unit 26 that a divergent, substantially spherical illumination wave 34 emanates from the illumination stop 30. In principle, the illumination stop 30 has an aperture region that is provided, in principle, for the passage of the measurement radiation 24, said aperture region defining the pupil 31 of the illumination module 16 and being circular in the shown case. Furthermore, a diffusion screen 32, which is rotated about an axis of rotation 33 during the measurement operation, is arranged in the region of the pupil plane, i.e., in the direct vicinity of the plane of the illumination stop 30. It serves to randomize the alternating phase between various points of the pupil 31.

The interferometer 18 is designed as a Fizeau interferometer and comprises a beam splitter 40, an adaptation optical unit 42 in the form of a focusing optical unit or a collimator, a splitting element 46 and a detection module 54 in the form of a camera.

The divergent beam of the illumination wave 34 initially passes through the beam splitter 40 and it is thereupon collimated by the adaptation optical unit 42 in such a way that the wavefront obtains a shape that is adapted to the intended shape of the optical surface 12 to be tested, i.e., substantially corresponds to or approximates the intended shape. Hence, the wavefront of the illumination wave 34 can have, for example, a plane or spherical shape after passing through the adaptation optical unit 42. The adaptation optical unit 42 can also contain diffractive optical elements in order to provide the wavefront of the illumination wave with, for example, an aspherical shape. The illumination wave 34 propagates along an optical axis 44 of the interferometer 18, said optical axis extending in the z-direction in FIG. 1.

Thereupon, the illumination wave 34 is incident on the splitting element 46 in the form of a Fizeau element with a Fizeau surface 48. Some of the radiation of the illumination wave 34 is reflected at the Fizeau surface 48 as a reference wave 52. In FIG. 1, the reference wave 52 is illustrated on the basis of an exemplary beam of the reference wave. The radiation of the illumination wave 19 passing through the splitting element 46 is incident on the optical surface 12 of the test object 14 as a test wave 50. Preferably, this is implemented within the scope of autocollimation, and so the test wave 50 substantially runs back along itself post interaction with the optical surface 12. In the case illustrated in FIG. 1, in which the test object 14 is embodied as a mirror, the interaction with the optical surface 12 can be implemented by reflection on the optical surface 12. In the case of an embodiment of the test object as a lens element, the interaction can be implemented by way of a twofold passage therethrough and a back-reflection with an additional reflective element.

The splitting element 46 has a tilted arrangement. The tilt is such that the Fizeau surface 48 is tilted by the tilt angle $\beta/2$ with respect to the normal plane 44N in relation to the optical axis 44. In the present embodiment, the tilt denoted by the tilt angle $\beta/2$ relates to a tilt about a tilt axis that is arranged at a 45° angle to both the x-axis and the y-axis; i.e., the tilt angle $\beta/2$ shown in FIG. 1 also has an equally large y-component in addition to the x-component visible in the figure. Here, the x-component and y-component of an angle is understood to mean that angle component that relates to an angle rotation about the x-axis and the y-axis, respectively. The returning test wave 50 post interaction with the optical surface 12 passes through the splitting element 46 without experiencing a directional change in the process and it is consequently merged with the reference wave 52 in a superposed beam path, in which the reference wave 52 is tilted by the tilt angle $\beta$ in relation to the returning test wave 50 on account of the aforementioned tilt of the Fizeau surface 48. According to one embodiment, the following applies to the tilt angle $\beta$:

$$\beta > 100 \cdot \lambda/D.$$

Here, $\lambda$ is the wavelength of the illumination wave 34 and D is the beam diameter of the reference wave 52 at the location of merging into the superposed beam path with the test wave 50, i.e., at the location of the splitting element 46. In the embodiment according to FIG. 1, D corresponds to the diameter of the adaptation optical unit 42. According to a numerical example, $\lambda = 633$ nm, $D = 200$ mm and hence $\beta > 0.32$ mrad.

Together with the tilted reference wave 52, the test wave 50 returning post interaction with the optical surface 12 is steered by the beam splitter 40 into the detection module 54. The detection module 54 comprises an imaging stop 56 that is arranged in a pupil plane of the detection module 54, a camera lens 58 and a two-dimensional resolving detector 60. The returning test wave 50 interferes with the reference wave 52 on a capturing surface of the detector 60 that is arranged in a detection plane 62. On account of the tilt of the reference wave 52 in relation to the returning test wave 50 through the tilt angle $\beta$, as caused by the oblique position of the splitting element 46, the intensity distribution $I_D(x,y)$ produced on the capturing surface of the detector 60 is a multi-fringe interference pattern 66.

In this text, a multi-fringe interference pattern should be generally understood to mean an interference pattern that comprises at least one full period of alternating fringes of constructive and destructive interference. A full period should be understood to mean that the phase difference between the interfering waves adopts all values between 0 and $2\pi$ along the multi-fringe interference pattern. Expressed differently, a multi-fringe interference pattern should be understood to mean an interference pattern having at least two fringes, when the fringes can be bright fringes (constructive interference) or dark fringes (destructive interference). In the multi-fringe interference pattern 66 shown in FIG. 1, more than 30 bright and dark fringes are contained in each case. On the basis of the multi-fringe interference pattern 66, the evaluation device 20 establishes the deviation of the shape of the optical surface 12 of the test object from the wavefront of the test wave 34, known in advance, and hence the actual shape of the optical surface 12.

The intensity distribution $I_P(u,v)$ in the pupil plane 28 of the illumination module 16 is configured by a corresponding design of the illumination stop 30. As is clear from the exemplary representation of $I_P(u,v)$ contained in FIG. 1, the latter has a spatially isolated, contiguous surface region 38 in the form of an arcuate fringe 38-1 with an intensity that exceeds a predetermined threshold. Thus, the illumination stop 30 only passes the measurement radiation 24 in the region of the arcuate fringe 38-1; by contrast, the measurement radiation is blocked by the illumination stop 30 in the remaining area of the pupil 31 that defines the maximum aperture. Like the plane of the imaging stop 56 of the detection module, too, the pupil plane 28 of the illumination module 16 is arranged in a Fourier plane of the detection plane 62. As emerges from the representation of the intensity distribution $I_D(u,v)$ within an aperture region 64 of the imaging stop 56 contained in FIG. 1, the intensity profile of the reference wave 52 is shifted obliquely downward in relation to the intensity profile of the returning test wave 50 in the pupil plane of the detection module 54. This is due to the tilt about the tilt angle β, described above, of the reference wave 52 in relation to the returning test wave 50.

The configuration of the intensity distribution $I_P(u,v)$ with the arcuate fringe facilitates the production of a high contrast in the multi-fringe interference pattern 66 while simultaneously suppressing disturbances traced back to defects on the optical surfaces of the interferometer 18, as described in more detail below.

FIGS. 3, 5, 6, 7, 8, 9 and 10 show further specific embodiments according to the invention of the intensity distribution $I_P(u,v)$ in the pupil plane 28 of the illumination module 16, which may take the place of the intensity distribution illustrated in FIG. 1. The intensity distribution $I_P(u,v)$ according to FIG. 3 has a spatially isolated, contiguous surface region 38 in the form of an arcuate fringe 38-1, which extends along a level curve of a path length difference distribution ΔOP(u,v) illustrated in FIG. 2. Here, the arcuate fringe 38-1 extends with both ends in each case to a corresponding portion of the ring-shaped edge 31R of the pupil 31.

Figure 2:
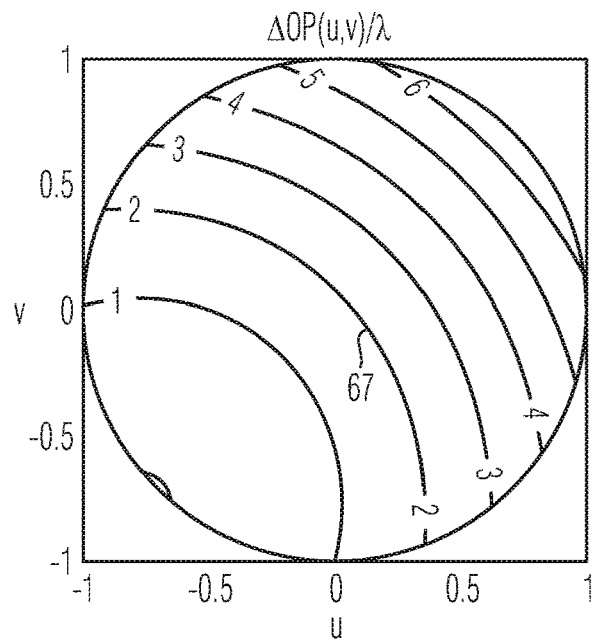
FIG. 2 shows an illustration of a distribution of a path length difference between test object path length and a reference path length in the measurement apparatus according to FIG. 1.

The path length difference distribution ΔOP(u,v) illustrated in FIG. 2 shows the distribution of a path length difference in the pupil 31 for a predetermined field point 62p in the detection plane 62, said field point being defined by the difference between a test object path length and a reference path length. Here, the test object path length is the path length passed through by the radiation of the test wave 50 from a given point of the pupil 31 to the field point 62p in the detection plane 62 and the reference path length is the path length passed through by the radiation of the reference wave 52 from the aforementioned point of the pupil 31 to the field point 62p in the detection plane. Thus, the respective path length extends from the pupil plane 28 to the detection plane 62, wherein the portion in the region between the pupil plane 28 and the splitting element 46 is passed by the illumination wave 34, which respectively supplies radiation for the test wave 50 and the reference wave 52. In the path length difference distribution ΔOP(u,v) illustrated in FIG. 1, level curves 67, i.e., lines with the same path length difference, are plotted for path length differences of integer λ values.

Figure 3:
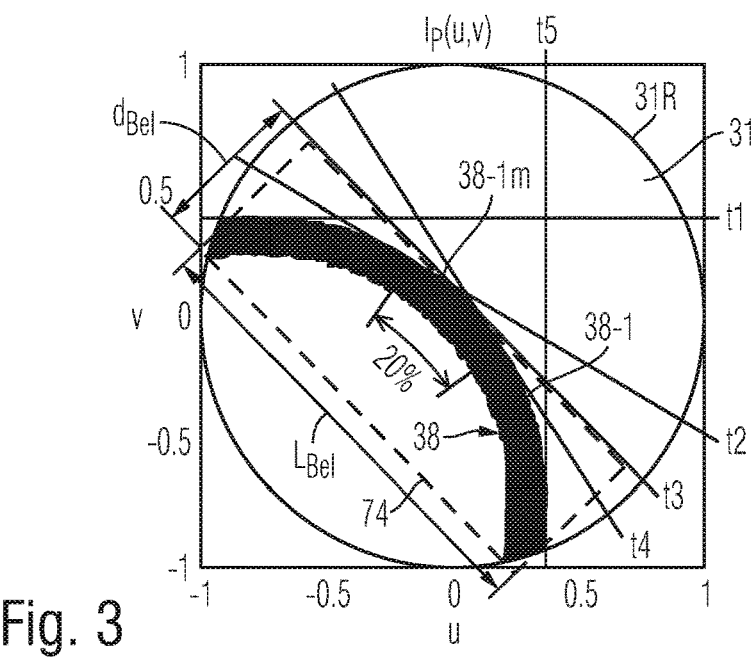
FIG. 3 shows an exemplary embodiment of intensity distribution according to the invention in an illumination pupil plane of the measurement apparatus according to FIG. 1.
Figure 3:
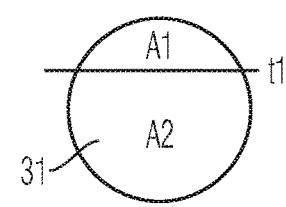
Figure 3:
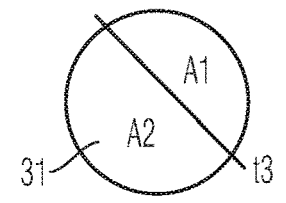

The arcuate fringe 38-1 of the intensity distribution $I_P(u, v)$ of the illumination wave 34 in the pupil plane 28 illustrated in FIG. 3 extends along the level curve 67 with the path length difference 2λ of the path length difference distribution ΔOP(u,v) according to FIG. 2. Here, the arcuate fringe 38-1 is configured in such a way that any tangent to the fringe 38-1 subdivides the pupil 31 into two parts, the areas of which differ by no more than a factor of 3. In order to describe these circumstances, tangents t1 to t5 tangential to the outer edge of the fringe 38-1 in each case are plotted in exemplary fashion in FIG. 3. Here, the tangents t1 and t5 are arranged at the respective ends of the fringe 38-1 and the tangent t3 is arranged in the center thereof. The tangents t2 and t4 are arranged at the respective ends of a central portion 38-1m of the fringe 38 that comprises 20% of the fringe 38-1.

As furthermore illustrated in FIG. 3, the tangent t1 divides the pupil 31 into an upper portion with the area A1 and a lower portion with the area A2, wherein the ratio A1/A2 is approximately 1:2.7. The same ratio emerges for t5. For the central tangent t3, the ratio is approximately 1:1.2. Hence, the ratio A1/A2 for any tangent on the fringe 38 lies in the range between approximately 1:1.2 and 1:2.7; i.e., the areas differ by a factor that lies between 1.2 and 2.7. The range is further restricted for the central portion 38-1m. According to a further embodiment, the arcuate fringe 38 is characterized in that there is at least one tangent, for which the areas A1 and A2 differ by no more than a factor of 20. According to a further embodiment, the arcuate fringe 38-1 is characterized in that the areas A1 and A2 differ by no more than a factor of 20 for each tangent on a portion comprising at least 20% of the fringe 38-1, for example the central portion 38-1m.

According to one embodiment, the following applies to an extent $L_{Bel}$ of the arcuate fringe 38-1 in the pupil plane 28 in at least one direction:

$$L_{Bel} > \lambda \cdot \frac{f}{l \cdot \beta}.$$

Here, λ is the wavelength of the illumination wave 34, f is the distance between the pupil plane 28 and the adaptation optical unit 42 and l is the distance between the splitting element 46 and the optical surface 12 of the test object. According to a numerical example, λ=633 nm, f=1020 mm, l=1000 mm, β=22mrad and hence $L_{Bel}$>0.2973 mm.

Furthermore, FIG. 3 plots a rectangle 74 with the smallest possible area that is fitted to the arcuate fringe 38-1. Expressed differently, the rectangle 74 is the smallest possible rectangle in terms of area that completely comprises the arcuate fringe 38-1; i.e., it is the rectangle that is fitted to the fringe 38-1 to the best possible extent in terms of area. The rectangle 74 has a length that corresponds to the aforementioned extent $L_{Bel}$ of the arcuate fringe 38 and has a width $d_{Bel}$. The aspect ratio of the rectangle 74 that is defined by the ratio $L_{Bel}/d_{Bel}$ is approximately 3:1 in the illustrated case and hence larger than 1.5:1.

Figure 4:
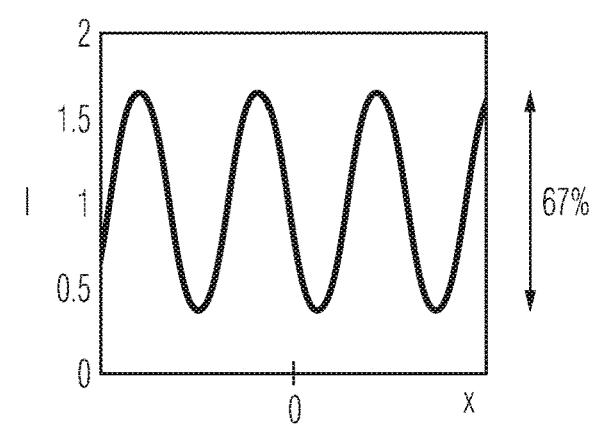
FIG. 4 shows an intensity curve in a multi-fringe interferogram produced with the intensity distribution according to FIG. 3.
Figure 13:
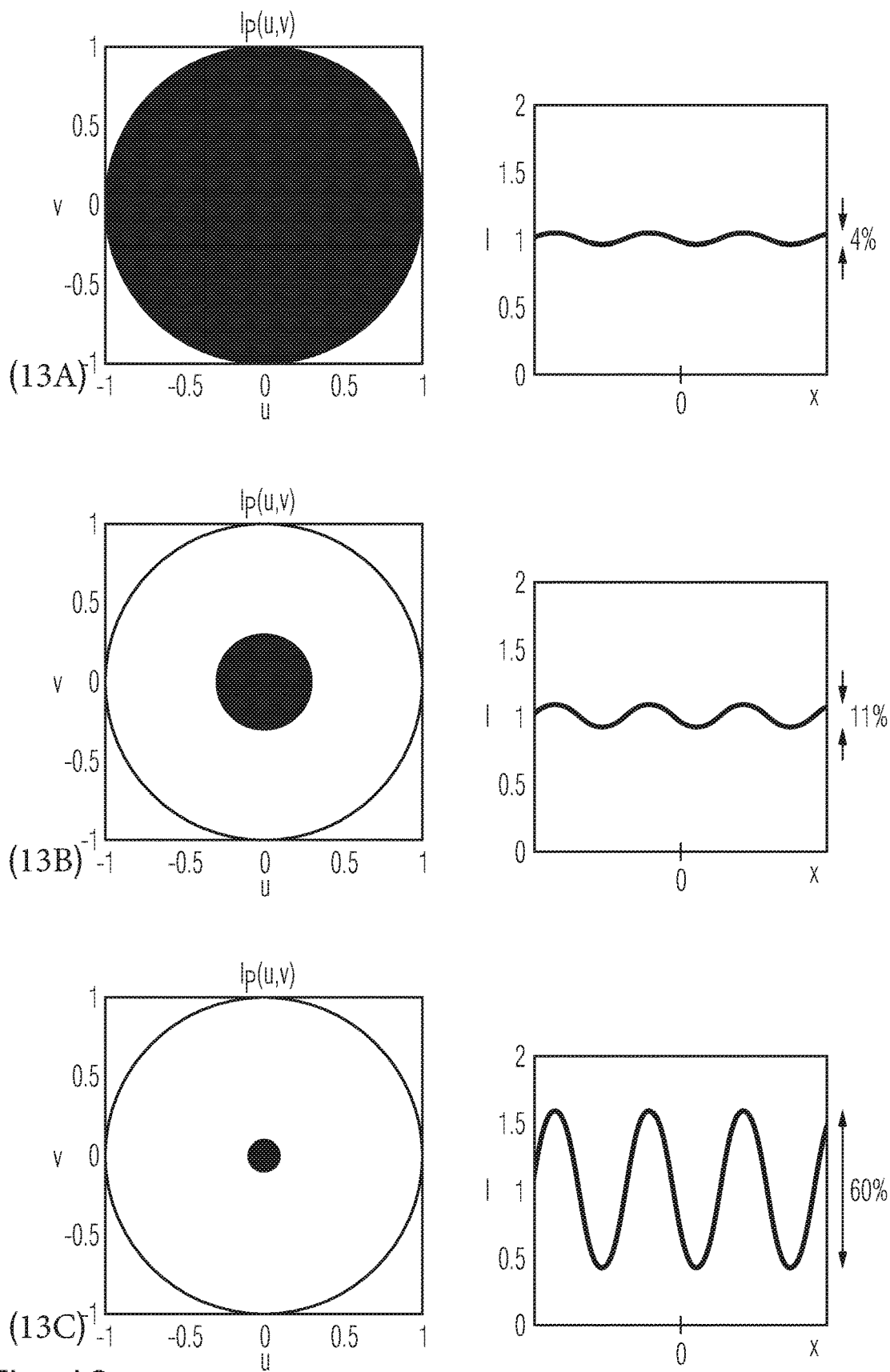
FIG. 13 shows comparison examples for intensity distributions in the illumination pupil plane and intensity curves for multi-fringe interferograms produced therewith, where

FIG. 4 shows the intensity curve along the x-axis in a central region of the multi-fringe interferogram 66 for the intensity distribution $I_P(u,v)$ in the pupil plane 28 shown in FIG. 3. The contrast of this intensity curve is approximately 67%. Hence, this multi-fringe interferogram 66 has a signal-to-noise ratio which facilitates a highly accurate evaluation and hence a highly accurate determination of the form of the optical surface 12 of the test object 14. Furthermore, with approximately 12%, the illumination of the pupil 31 of the illumination module 16 is substantially higher than in the case of, for example, an intensity distribution $I_P(u,v)$ of a punctiform illumination in the pupil plane 28 as shown under (c) in FIG. 13. In this intensity distribution, which is illustrated as a comparison example, a contrast of approximately 60%, which is almost just as high, is obtained, even though the illumination is only approximately 1%.

As already mentioned above, the illumination is a measure for how well disturbances that are traced back to defects on the optical surface of the interferometer 18 can be suppressed. Hence, the embodiment according to FIG. 3 facilitates a substantially improved defect suppression in relation to the comparison example shown in FIG. 13C. The defect suppression can be improved if the central illumination disk is enlarged. An illumination of approximately 8%, which is approximately as good as in the embodiment according to the invention as per FIG. 3, arises in the embodiment of the intensity distribution $I_P(u,v)$ illustrated in FIG. 13B as a further comparison example, in which the central illumination has a disk-shaped embodiment; however, the contrast in this case drops to value of approximately 11% and hence drops to far below the value that is obtainable with the embodiment according to the invention as per FIG. 3. If the central illumination disk from the intensity distribution illustrated in FIG. 13B is increased further, the contrast drops further, for example to a value of 4%, as in the further comparison example illustrated in FIG. 13A for the illumination of the entire pupil.

Figure 5:
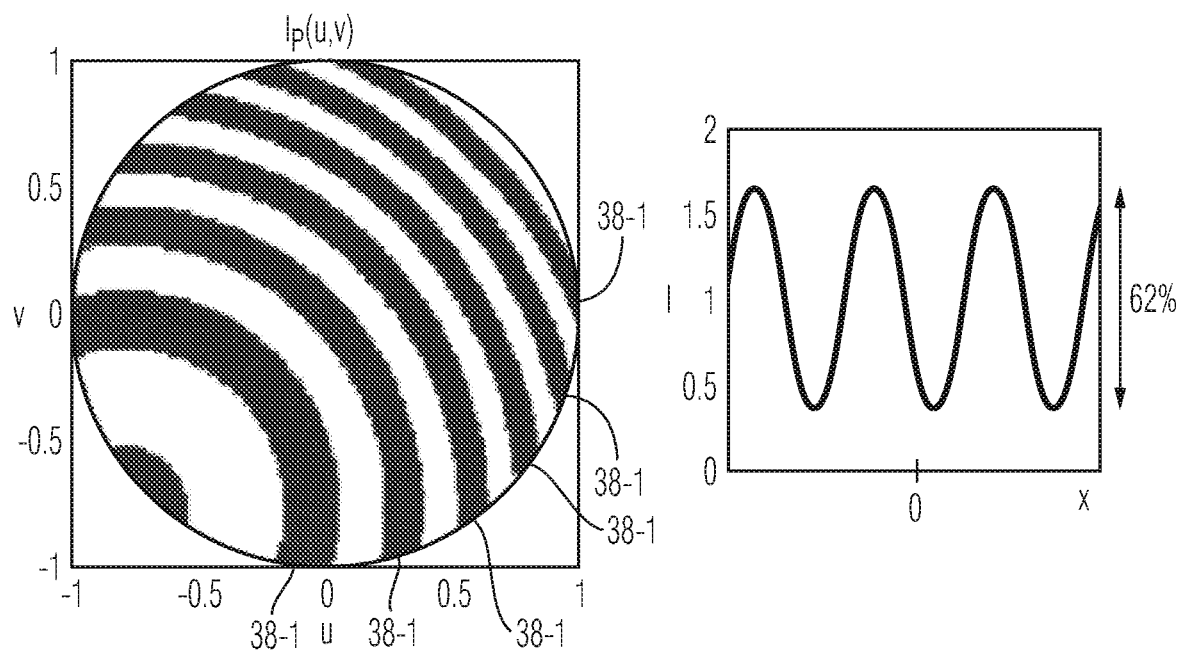
FIG. 5 shows a further exemplary embodiment of an intensity distribution according to the invention in the illumination pupil plane of the measurement apparatus according to FIG. 1 and an intensity curve in a multi-fringe interferogram produced with this intensity distribution.

FIG. 5 shows a further embodiment of the intensity distribution $I_P(u,v)$ according to the invention in the pupil plane 28 of the illumination module 16. This intensity distribution has a plurality of arcuate fringes 38-1, which extend along level curves of the path length difference distribution $\Delta OP(u,v)$ illustrated in FIG. 2. Here, an arcuate fringe 38-1 is assigned to each level curve with an integer wavelength difference in this embodiment. According to further embodiment variants, the arcuate fringes 38-1 according to FIG. 5 each can have features that are listed above in respect of the arcuate fringe 38-1 described on the basis of FIG. 3. The illumination of the pupil 31 is approximately 60% in the intensity distribution according to FIG. 5, as a result of which the defect suppression is once again significantly improved in relation to the embodiment according to FIG. 3. Here, the contrast of the intensity curve in the central region of the multi-fringe interferogram 66 is only slightly reduced at approximately 62%.

Figure 6:
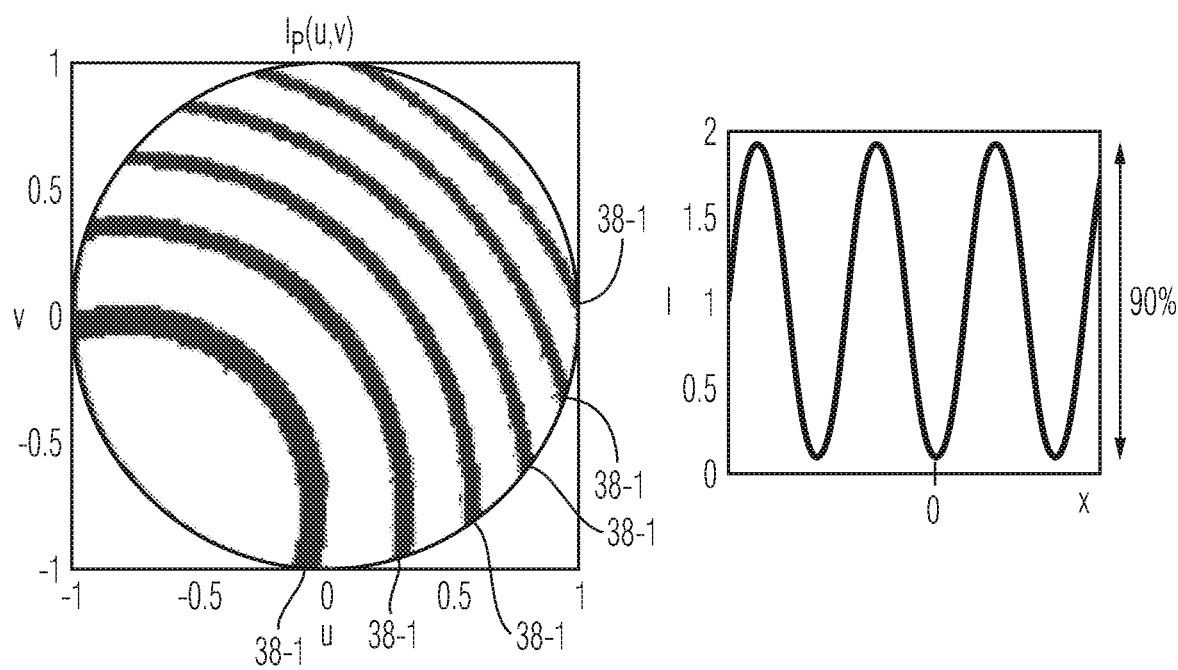
FIG. 6 shows a further exemplary embodiment of an intensity distribution according to the invention in the illumination pupil plane of the measurement apparatus according to FIG. 1 and an intensity curve in a multi-fringe interferogram produced with this intensity distribution.

FIG. 6 shows a further embodiment of the intensity distribution $I_P(u,v)$ according to the invention in the pupil plane 28 of the illumination module 16. The latter differs from the intensity distribution according to FIG. 5 in that the arcuate fringes have a narrower embodiment such that an illumination of approximately 20% arises. As a result, the contrast of the intensity profile in the central region of the multi-fringe interferogram 66 can be increased significantly, to be precise to approximately 90%.

Figure 7:
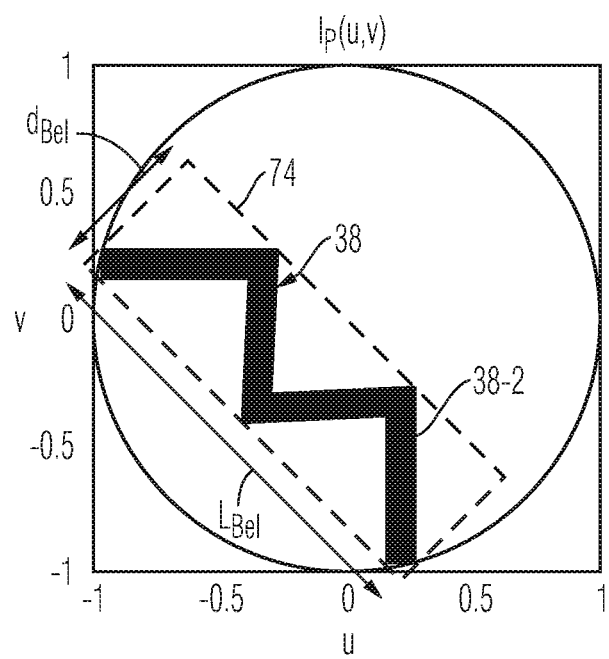
FIG. 7 shows a further exemplary embodiment of intensity distribution according to the invention in the illumination pupil plane of the measurement apparatus according to FIG. 1.

FIG. 7 shows a further embodiment of the intensity distribution $I_P(u,v)$ according to the invention in the pupil plane of the illumination module 16. The intensity distribution $I_P(u,v)$ according to FIG. 7 has a spatially isolated, contiguous surface region 38 in the form of a zigzag-shaped fringe 38-2. The zigzag-shaped fringe 38-2 has two rising and two falling portions. Furthermore, FIG. 7 plots a rectangle 74 with the smallest possible area that is fitted to the zigzag-shaped fringe 38-2. Analogous to the rectangle 74 according to FIG. 3, the rectangle 74 has a length $L_{Bel}$ and a width $d_{Bel}$. The aspect ratio of the rectangle 74 according to FIG. 7 that is defined by the ratio $L_{Bel}/d_{Bel}$ is approximately 3:1 in the illustrated case and hence larger than 1.5:1. The zigzag-shaped fringe 38-2 is arranged in such a way that the longer axis of symmetry of the rectangle 74 assigned thereto extends substantially parallel to a mean direction of a level curve of a path length difference distribution $\Delta OP(u,v)$ illustrated in FIG. 2.

Figure 8:
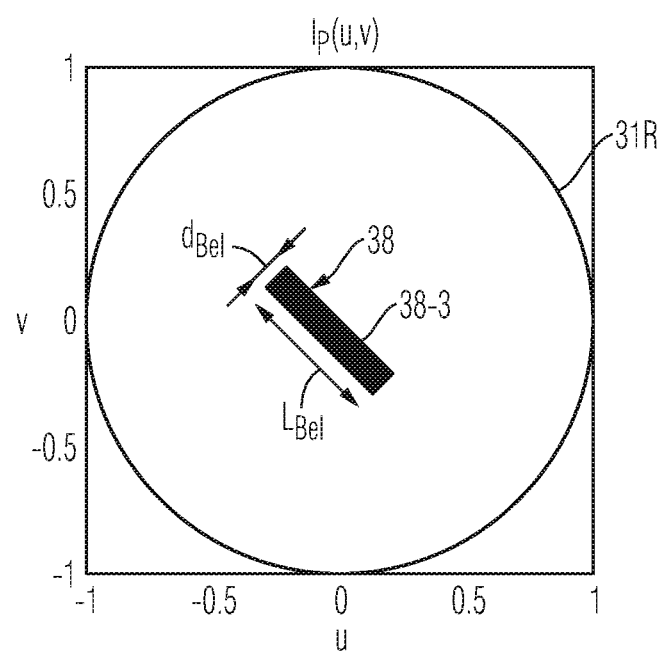
FIG. 8 shows a further exemplary embodiment of intensity distribution according to the invention in the illumination pupil plane of the measurement apparatus according to FIG. 1.

FIG. 8 shows a further embodiment of the intensity distribution $I_P(u,v)$ according to the invention in the pupil plane of the illumination module 16. The intensity distribution $I_P(u,v)$ according to FIG. 8 has a spatially isolated, contiguous surface region 38 in the form of a straight fringe 38-3, i.e., a fringe having the shape of a straight line. A rectangle with the smallest possible area that is fitted to the straight fringe 38-3 corresponds to the fringe 38-3 itself. The fringe 38-3 or the rectangle has a length $L_{Bel}$ and a width $d_{Bel}$. The aspect ratio of the straight fringe 38-3 according to FIG. 8 that is defined by the ratio $L_{Bel}/d_{Bel}$ is approximately 3.5:1 in the illustrated case and hence larger than 1.5:1. The straight fringe 38-3 is arranged in such a way that longitudinal extent thereof extends substantially parallel to a mean direction of a level curve of a path length difference distribution $\Delta OP(u,v)$ illustrated in FIG. 2. In the shown embodiment, the longitudinal extent of the straight fringe 38-3 is oriented transversely to the pupil edge 31R. Here, the straight fringe 38-3 in the shown embodiment extends centrally within the pupil 31 over a length region of approximately 30-40% of the diameter of the pupil 31. In other embodiments, the straight fringe can also extend over smaller or larger regions of the pupil 31, in particular over the entire pupil 31, i.e., from a region of the pupil edge 31R to an opposite region of the pupil edge 31R.

Figure 9:
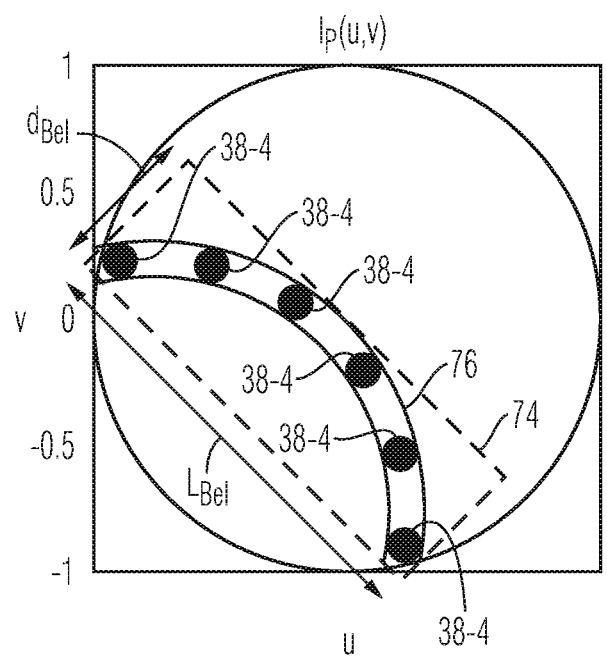
FIG. 9 shows a further exemplary embodiment of intensity distribution according to the invention in the illumination pupil plane of the measurement apparatus according to FIG. 1.

FIG. 9 shows a further embodiment of the intensity distribution $I_P(u,v)$ according to the invention in the pupil plane of the illumination module 16. The intensity distribution $I_P(u,v)$ according to FIG. 9 has a plurality of spatially isolated, contiguous surface regions 38. In the illustrated embodiment, six such surface regions are present, in each case in the form of a circular surface region 38-4.

Furthermore, FIG. 9 plots a rectangle 74 with the smallest possible area that is fitted to the totality of the surface regions 38-4. Expressed differently, the rectangle 74 is the smallest rectangle in terms of area that completely comprises the totality of the surface regions 38-4. The rectangle 74 has a length that corresponds to the aforementioned extent $L_{Bel}$ of the arcuate fringe 38 and has a width $d_{Bel}$. The aspect ratio of the rectangle 74 that is defined by the ratio $L_{Bel}/d_{Bel}$ is approximately 3:1 in the illustrated case and hence larger than 1.5:1.

Furthermore, FIG. 9 plots a covering surface in the form of an arcuate fringe 76 that is adapted in form to the totality of the surface regions 38-4. Expressed differently, the arcuate fringe 76 corresponds to an area which covers the surface regions and which is fitted to the shape of the arrangement of the surface regions 38-4. The shape of the arrangement of the surface region 38-4 can be an extrapolated or abstracted arrangement form, in particular. In the present case, the arcuate fringe 76 defined by the covering surface adapted to the form corresponds to the arcuate fringe 38-1 according to FIG. 3, which was explained above. The aforementioned rectangle 74 is also the rectangle with the smallest possible area that is fitted to the arcuate fringe 76, and therefore corresponds to the rectangle 74 according to FIG. 3.

Figure 10:
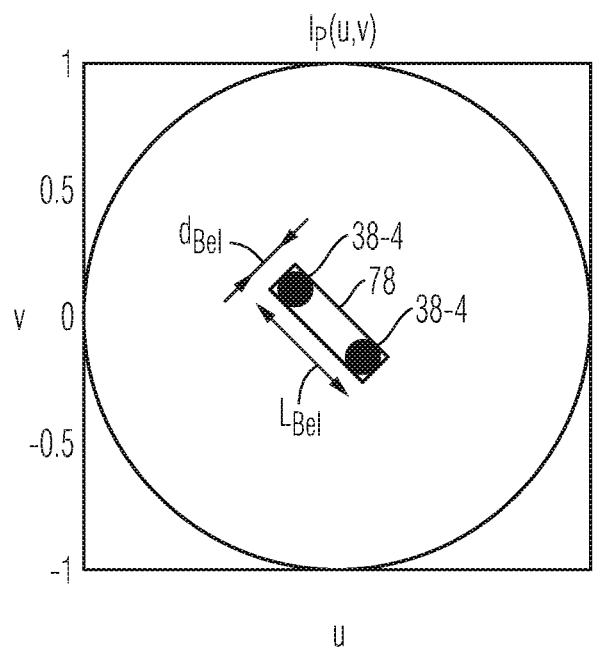
FIG. 10 shows a further exemplary embodiment of intensity distribution according to the invention in the illumination pupil plane of the measurement apparatus according to FIG. 1.

FIG. 10 shows a further embodiment of the intensity distribution $I_P(u,v)$ according to the invention in the pupil plane of the illumination module 16. The intensity distribution $I_P(u,v)$ according to FIG. 10 has a plurality of spatially isolated, contiguous surface regions 38. In the illustrated embodiment, two such surface regions are present, in each case in the form of a circular surface region 38-4. Consequently, the shown intensity distribution $I_P(u,v)$ is dipole-shaped.

Furthermore, FIG. 10 plots a covering surface in the form of a straight fringe 78 that is adapted in form to the totality of the surface regions 38-4. Expressed differently, the straight fringe 78 corresponds to an area which covers the surface regions and is fitted to the shape of the arrangement of the surface regions 38-4. In the present case, the straight fringe 78 defined by the covering surface adapted to the form corresponds to the straight fringe 38-3 according to FIG. 8, which was explained above. Furthermore, the circumference of the fringe 78 forms a rectangle with the smallest possible area that is fitted to the totality of the surface regions 38-4. Like the straight fringe 38-3 according to FIG. 8, the latter has an aspect ratio which is defined by the ratio $L_{Bel}/d_{Bel}$ and which is approximately 3.5:1 in the illustrated case.

Figure 11:
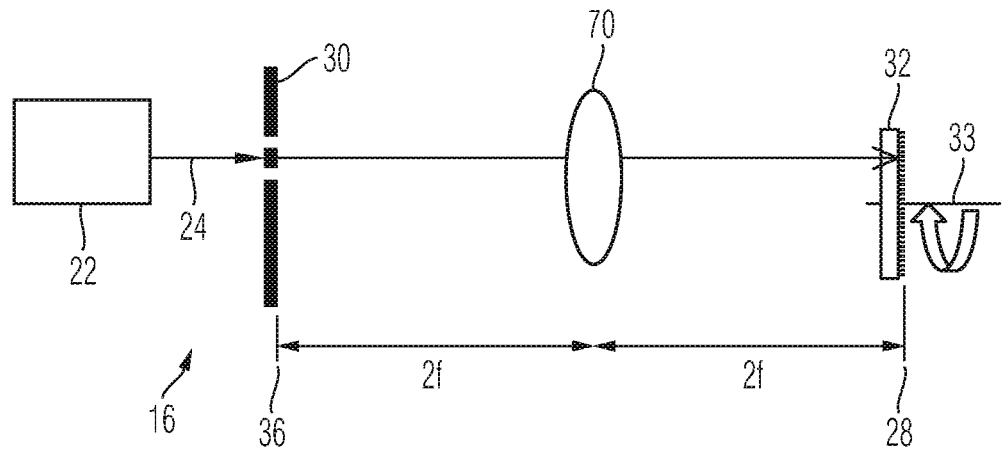
FIG. 11 shows an exemplary embodiment of an illumination module for the measurement apparatus according to FIG. 1.
Figure 12:
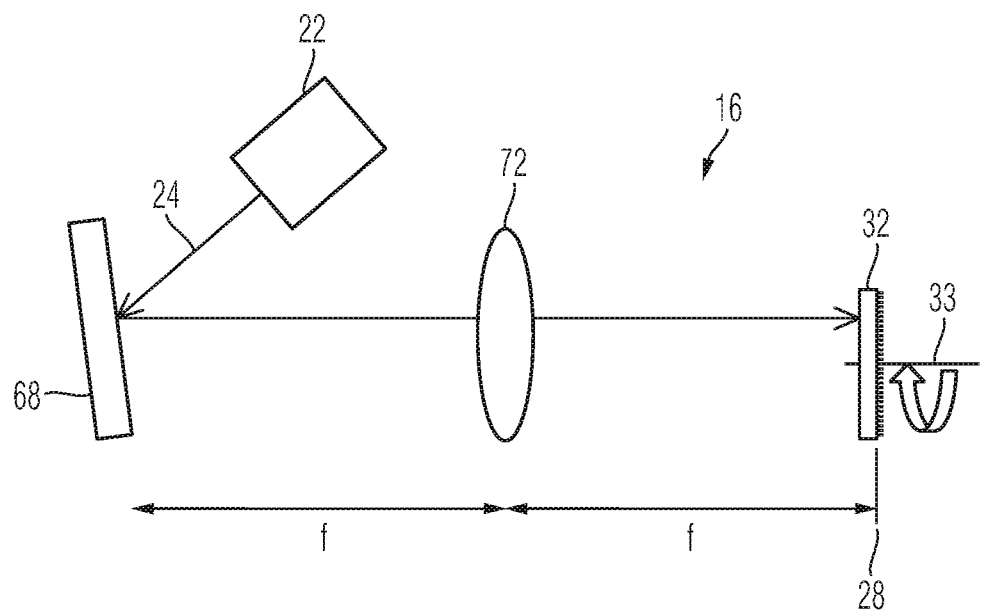
FIG. 12 shows a further exemplary embodiment of an illumination module for the measurement apparatus according to FIG. 1.

FIGS. 11 and 12 show further embodiments of an illumination module 16, which can be used instead of the illumination module 16 shown in FIG. 1. In the embodiment according to FIG. 11, the mechanical illumination stop 30 is arranged in a plane 36 of this conjugate to the pupil plane 28. The plane 36 is imaged on the rotatable diffusion screen 32, which is still arranged in the pupil plane 28, using a 4f imaging optical unit 70. In the embodiment according to FIG. 12, a spatial light modulator 68 is used instead of a mechanical stop for the purposes of producing the intensity distribution in the pupil 31. In the shown embodiment, the spatial light modulator 68 is operated in reflection and, to this end, it is irradiated at an oblique angle with the measurement radiation 24 by the radiation source 22. Thereupon, the variably reflected radiation passes through a 2f imaging optical unit, with which the surface of the light modulator 68 is imaged onto the rotatable diffusion screen 32 arranged in the pupil plane 28.

The above description of exemplary embodiments is to be understood to be by way of example. The disclosure effected thereby firstly enables the person skilled in the art to understand the present invention and the advantages associated therewith, and secondly encompasses alterations and modifications of the described structures and methods that are also apparent to and understood by the person skilled in the art. Therefore, the applicant seeks to cover also all such alterations and modifications, insofar as they fall within the scope of the invention as defined by the accompanying claims and equivalents thereof.

LIST OF REFERENCE SIGNS

10 Measurement apparatus
12 Optical surface
14 Test object
16 Illumination module
18 Interferometer
20 Evaluation unit
22 Radiation source
24 Measurement radiation
26 Focusing optical unit
28 Pupil plane
30 Illumination stop
31 Pupil of the illumination module
31R Edge of the pupil
32 Diffusion screen
33 Axis of rotation
34 Illumination wave
36 Conjugate plane
38 Surface region
38-1 Arcuate fringe
38-1m Central portion
38-2 Zigzag-shaped fringe
38-3 Straight fringe
38-4 Circular surface region
40 Beam splitter
42 Adaptation optical unit
44 Optical axis
44N Normal plane to the optical axis
46 Splitting element
48 Fizeau surface
50 Test wave
52 Reference wave
54 Detection module
56 Imaging stop
58 Camera lens
60 Detector
62 Detection plane
62p Field point
64 Aperture region
66 Multi-fringe interference pattern
67 Level curve
68 Spatial light modulator
70 4f imaging optical unit
72 2f imaging optical unit
74 Rectangle with the smallest possible area
76 Arcuate fringe
78 Straight fringe

What is claimed is:

1. A measurement apparatus for determining a shape of an optical surface of a test object by interferometry, comprising:
   an illumination module configured to produce an illumination wave,
   an interferometer configured to split the illumination wave into a test wave, which is directed onto the optical surface, and a reference wave with a tilt relative to one another such that a multi-fringe interference pattern is produced in a detection plane of the interferometer by superposition of the test wave and the reference wave,
   wherein the illumination module has a pupil plane that is arranged in a Fourier plane of the detection plane and the illumination module is configured to produce the illumination wave such that an intensity distribution of the illumination wave in the pupil plane comprises at least one spatially isolated and contiguous surface region that is configured such that a rectangle with a smallest possible area that is fitted to the at least one surface region has an aspect ratio of at least 1.5:1.

2. The measurement apparatus as claimed in claim 1, wherein the intensity distribution in the pupil plane comprises the at least one contiguous surface region and wherein the contiguous surface region is embodied as a fringe.

3. The measurement apparatus as claimed in claim 1, wherein the intensity distribution in the pupil plane comprises a plurality of the contiguous surface regions and a covering surface that is adapted in form to a totality of the surface regions is embodied as a fringe.

4. The measurement apparatus as claimed in claim 2, wherein the fringe is an arcuate fringe.

5. The measurement apparatus as claimed in claim 4, wherein a pupil of the illumination module assigned to the pupil plane is delimited by a ring-shaped edge and the arcuate fringe is configured such that there is at least a tangent on the fringe which subdivides the pupil into two parts, and wherein respective areas of the parts differ from one another by no more than a factor of twenty.

6. The measurement apparatus as claimed in claim 5, wherein each tangent on at least one portion of the fringe comprising a total of at least 20% of the fringe subdivides the pupil respectively into two parts, and wherein respective areas of the parts differ from one another by no more than a factor of twenty.

7. The measurement apparatus as claimed in claim 2, wherein the fringe is a straight fringe.

8. The measurement apparatus as claimed in claim 2, wherein a pupil of the illumination module assigned to the pupil plane is delimited by a ring-shaped edge and the fringe extends transversely to the edge of the pupil.

9. The measurement apparatus as claimed in claim 2, wherein the intensity distribution in the pupil plane comprises a plurality of the fringes.

10. The measurement apparatus as claimed in claim 2, wherein a path length difference of a pupil point in the pupil plane for a field point in the detection plane is defined by a difference between a test path length and a reference path length, wherein the test path length is the path length run through by the radiation of the test wave from the pupil point to the field point in the detection plane and the reference path length is the path length run through by the radiation of the reference wave from the pupil point to the field point in the detection plane, and wherein the fringe extends along a level curve of the path length difference of the field point.

11. The measurement apparatus as claimed in claim 10, wherein a plurality of the fringes extend in the pupil plane along level curves of the path length difference of the field point, and wherein the level curves differ by integer multiples of the wavelength of the illumination wave.

12. The measurement apparatus as claimed in claim 1, wherein the interferometer is configured to merge the test wave post interaction with the optical surface and the reference wave in a superposed beam path, in which the reference wave is tilted in relation to the test wave by a tilt angle $\beta$, such that:

$$\beta > 100 \cdot \lambda/D$$

where $\lambda$ is the wavelength of the illumination wave and $D$ is the beam diameter of the reference wave at the location of merging into the superposed beam path with the test wave.

13. The measurement apparatus as claimed in claim 1, wherein the interferometer comprises a splitting element configured to split the illumination wave into the test wave and the reference wave and said interferometer is further configured to merge the test wave post interaction with the optical surface and the reference wave into a superposed beam path in which the reference wave is tilted in relation to the test wave by a tilt angle $\beta$, and the illumination module is configured such that the intensity distribution in the pupil plane in at least one direction has an extent $L_{Bel}$, such that:

$$L_{Bel} > \lambda \cdot \frac{f}{l \cdot \beta}$$

where $\lambda$ is the wavelength of the illumination wave, $f$ is a distance between the pupil plane of the illumination module and an adaptation optical unit of the interferometer configured to adapt the wavefront of the illumination wave to an intended form of the optical surface of the test object, and $l$ is a distance between the splitting element and the optical surface of the test object.

14. The measurement apparatus as claimed in claim 1, wherein the intensity distribution in the pupil plane is configured such that the multi-fringe interference pattern has a contrast of at least 50% in the at least one region.

15. The measurement apparatus as claimed in claim 1, wherein the intensity distribution is configured such that no more than 70% of the pupil, assigned to the pupil plane, of the illumination module is illuminated.

16. The measurement apparatus as claimed in claim 1, wherein the illumination module comprises a spatial light modulator configured to produce the intensity distribution in the pupil plane.

17. The measurement apparatus as claimed in claim 1, wherein the intensity distribution of the illumination wave in the pupil plane comprises a plurality of the contiguous surface regions and the rectangle with the smallest possible area that is fitted to the totality of the surface regions has an aspect ratio of at least 1.5:1.

18. A method for determining a shape of an optical surface of a test object by interferometry, comprising:
producing an illumination wave with an illumination module, and
splitting the illumination wave with an interferometer into a test wave, which is directed onto the optical surface, and a reference wave, which are tilted relative to one another such that a multi-fringe interference pattern is produced in a detection plane of interferometer by superposition of the test wave and the reference wave,
wherein the illumination wave is produced such that an intensity distribution of the illumination wave in a pupil plane arranged in a Fourier plane of the detection plane comprises at least one spatially isolated and contiguous surface region that is configured such that a rectangle with a smallest possible area that is fitted to the at least one surface region has an aspect ratio of at least 1.5:1.

19. The method as claimed in claim 18, wherein the intensity distribution of the illumination wave in the pupil plane arranged in the Fourier plane of the detection plane comprises plural spatially isolated and contiguous surface regions that are configured such that a rectangle with a smallest possible area that is fitted to a totality of the surface regions has an aspect ratio of at least 1.5:1.

* * * * *

UNITED STATES PATENT AND TRADEMARK OFFICE
CERTIFICATE OF CORRECTION

PATENT NO. : 10,527,403 B2
APPLICATION NO. : 16/251703
DATED : January 7, 2020
INVENTOR(S) : Jochen Hetzler Page 1 of 1

It is certified that error appears in the above-identified patent and that said Letters Patent is hereby corrected as shown below:

Sheet 2 of 7 (Fig. 3), Line 5, Delete "1:2,7" and insert -- 1:2.7 --, therefor.

Sheet 2 of 7 (Fig. 3), Line 9, Delete "1:1,2" and insert -- 1:1.2 --, therefor.

Column 10, Line 42, Delete "$I_D (x,y)$" and insert -- $I_D(x,y)$ --, therefor.

Signed and Sealed this
First Day of September, 2020

Andrei Iancu
*Director of the United States Patent and Trademark Office*